O. L. BRAINARD.
MOTOR DRAY.
APPLICATION FILED JULY 8, 1916.
1,235,875.
Patented Aug. 7, 1917.
3 SHEETS—SHEET 2.
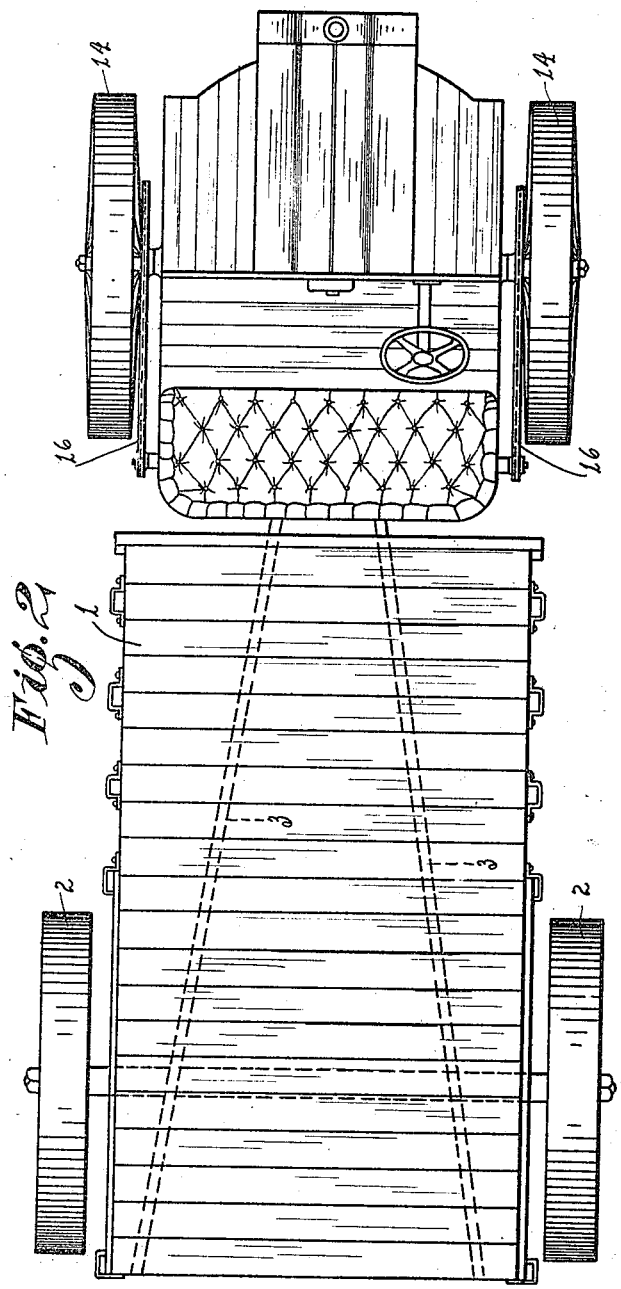
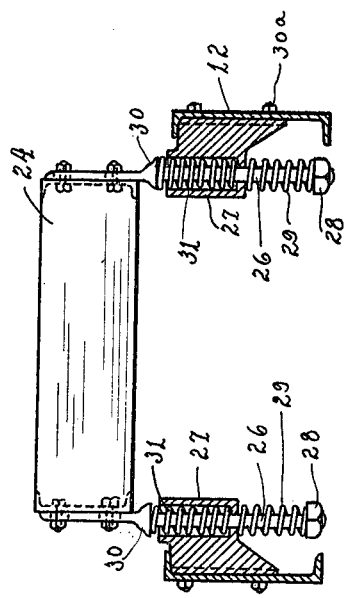
WITNESS.
INVENTOR.
Omar L. Brainard
BY
ATTORNEY.

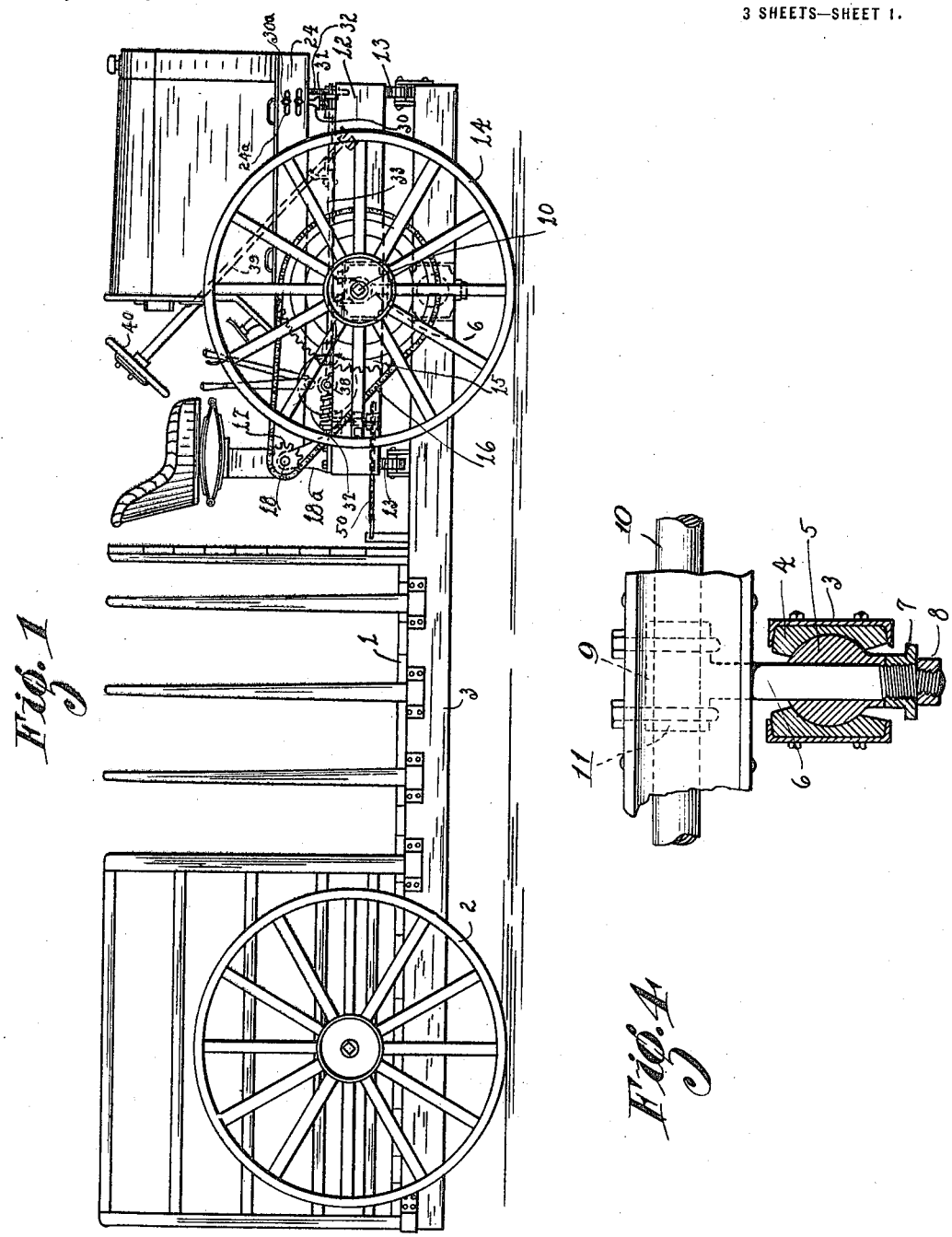

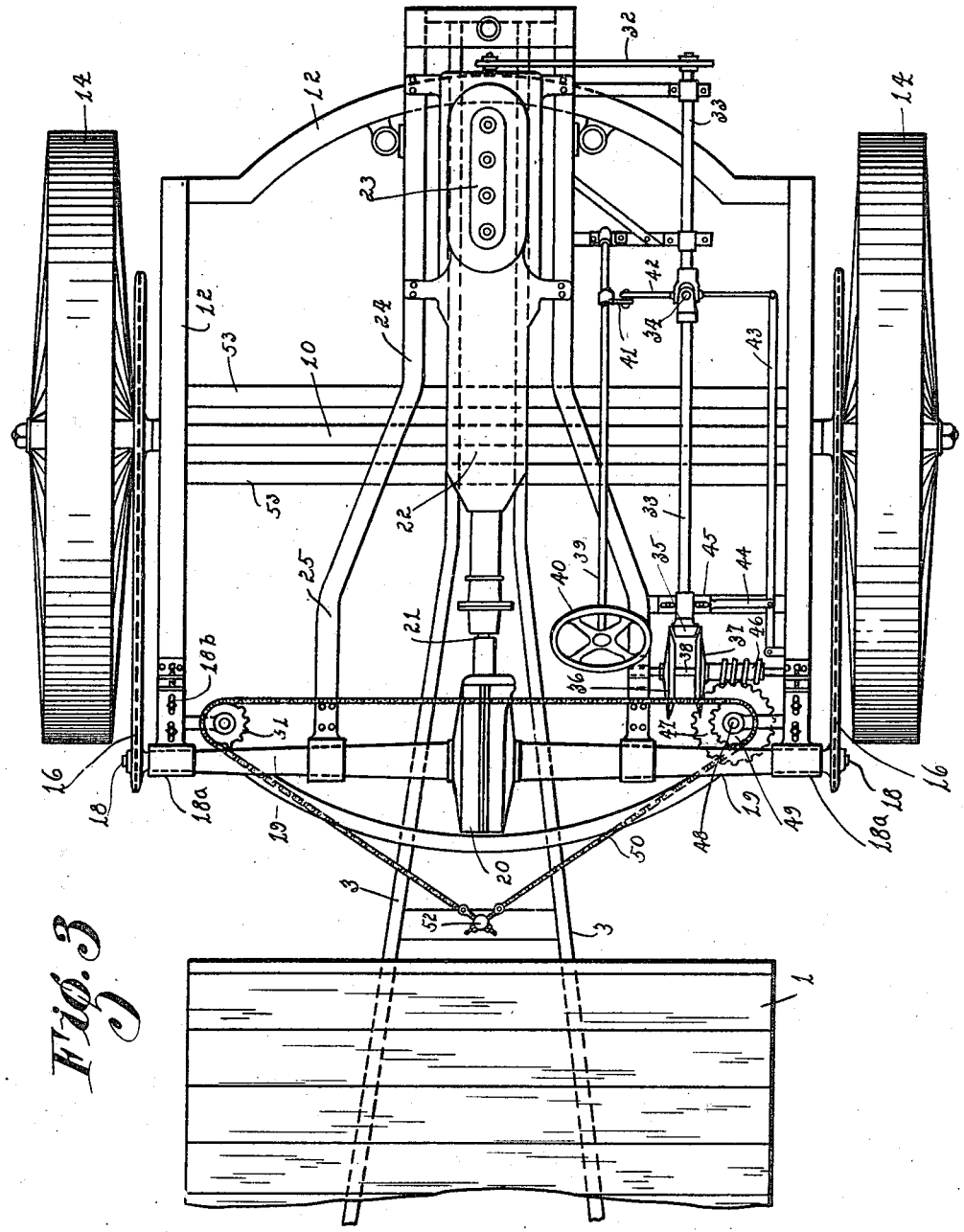

UNITED STATES PATENT OFFICE.

OMAR L. BRAINARD, OF SACRAMENTO, CALIFORNIA.

MOTOR-DRAY.

1,235,875.   Specification of Letters Patent.   Patented Aug. 7, 1917.

Application filed July 8, 1916. Serial No. 108,142.

*To all whom it may concern:*

Be it known that I, OMAR L. BRAINARD, a citizen of the United States, residing at Sacramento, in the county of Sacramento, State of California, have invented certain new and useful Improvements in Motor-Drays; and I do declare the following to be a full, clear, and exact description of the same, reference being had to the accompanying drawings, and to the characters of reference marked thereon, which form a part of this application.

This invention relates to improvements in motor vehicles used for trucking purposes and is particularly adapted for use as a motor dray in which there may be a low dray body on which heavy machinery or other freight may be easily loaded and removed.

I aim by my improved invention to have the body of the dray as close to the ground as is necessary and practical with the power plant entirely independent of the said body. To this end I provide the body or load unit with a projecting tongue which I pivotally suspend below the frame of the power unit centrally thereof with the outer ends of the frame of the power unit balanced on the said tongue which projects beyond each side of its pivotal point for this purpose. In connection with this latter structure I also provide an efficient steering means for the power unit and the general construction of the power unit is made as simple and effective as possible with the power plant readily accessible for all purposes.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1 is a side elevation of my complete motor dray.

Fig. 2 is a top plan view of the same.

Fig. 3 is a plan view showing the power unit.

Fig. 4 is a sectional view showing how the carrying unit is suspended from the power unit.

Fig. 5 is a front elevation in section of the engine frame showing its connection with the engine supporting frame.

Referring now more particularly to the characters of reference on the drawings, the numeral 1 designates the body of the carrying portion of the dray which is constructed in any desired manner and at any desired height from the ground and mounted on rear supporting wheels 2 in any desired manner. The dray body 1 is supported on two channel or other suitably shaped beams 3 which converge from the rear end of the dray body 1 toward the forward end thereof and which at their outer ends extend parallel with each other in spaced relation. Clamped between the beams 3 at a point near their forward ends are socket casings or housings 4 which receive and hold a ball 5 mounted on a king bolt 6 and held in position thereon by means of a nut 7 and a jam nut 8. The king bolt 6 is provided with a sleeve 9 which fits around an axle 10 and is held in fixed position by means of U-bolts 11. This axle 10 is supported in the sides of a frame 12 which frame rests at its forward and rear ends upon rollers 13 mounted on the beams 3. By means of the ball and socket joint 4—5 and these rollers 13, the frame 12 is capable of rotary motion relative to the said beams 3 and also any slight side play between the parts is likewise allowed for by means of this ball and socket joint.

As noted, the axle 10 is supported in the frame 12 and constitutes the main axle for the power unit of the dray and to that end has on its outer ends the forward driven wheels 14 which, as has already been noted, are made of large diameter and very strong, and provided with wooden tires instead of pneumatic tires. Each of the wheels 14 is provided with a driving sprocket 15, which sprockets are connected by driving chains 16 with sprockets 17 on the shaft 18. This shaft 18 is journaled in bearings 18$^a$ extending upwardly from the rear end of the frame 12. The shaft 18 extends through housing sleeves 19 which terminate in the differential housing 20. Within this housing 20 are any suitable differential gears connected with a shaft 21 through a gear transmission mechanism of any suitable type, as at 22, with suitable intermediate joints and other mechanical perfections commonly used, such shaft 21 being driven by the power engine or motor 23 by means of suitable clutch connections of the common type, not here specifically shown or described. The engine 23 is suitably bolted to the engine frame 24, which engine frame has projecting rear supporting parts 25 clamped on the housings 19.

The forward end of the engine frame 24 is provided with downwardly projecting bolts 26 which extend through recessed supports 27 suitably mounted on the forward end of the frame 12. On the lower ends of the bolts 26 are nuts or other suitable heads 28 and I provide springs 29 interposed between these members 28 and the bottom of the recessed members 27. Near the frame 24 the bolts 26 are provided with stops or flanges 30 and I provide springs 31 interposed between the bottom of the recessed members 27 and these stops 30. Thus it will be noted that the forward end of the engine frame is mounted on a spring cushion and the rear end is swung on the rear axle or shaft 18. Thus when a load is first taken up by the engine and it tends to throw itself backward, the rack or jar occasioned by this tendency is compensated for by the spring cushioning structure herein fully described.

With the operation of the engine 23 power may be transmitted from such engine through the transmission gears 22, shaft 21, differential gear, shaft 18, sprockets 17, chains 16, sprockets 15, thence to the wheels 14, so that the power unit consists merely of a two-wheeled member below which is suspended the tongue of the dray and on which tongue, as suspended, the power unit rests at both its forward and rear ends for keeping the same balanced in accurate position. In other words, the power unit comprises merely a two-wheeled driven member, suspended below which is the tongue of the dray, such body extending a sufficient distance to both the front and rear of the power unit so that the power unit may be kept properly balanced thereon relative to the body of the dray. The more the dray is loaded therefore, the better will be the balance of the power unit relative to the same. Hence the advantages of my improved structure may be readily seen.

The steering mechanism consists in steering the entire frame 12 and its connected parts, including the wheels 14, and this is accomplished by means of the following structure, namely: A chain 32 is driven by the engine shaft and connected to a shaft 33 provided with a universal joint 34 and with a friction member 35 arranged to be thrown into engagement with either one or the other of the friction disks 36 and 37 mounted on the shaft 38. This positioning of the member 35 is accomplished by means of the steering post 39 having a steering wheel 40. The lower end of the post 39 is provided with a projecting member 41 which is flexibly connected with a link 42 engaged at its outer end with a lever 43. This lever 43 is connected by a link 44 with a slidable sleeve 45 through which the shaft 33 extends. Thus by turning the wheel 40 in one direction or the other, the shaft 33 will be moved in one direction or the other and engage the members 35 with either the disk 36 or the disk 37. This action steers the power unit in one direction or the other by means of the following structure:

On the shaft 38 is a worm 46 which engages a gear 47 on a small shaft 48. On this shaft 48 is a sprocket wheel 49. A chain 50 engages the sprocket wheel 49 and also another sprocket wheel 51 on the opposite side of the frame 12, such chain 50 being anchored in fixed position relative to the members 3 as at 52. Thus when the engine drives either the disk 36 or 37 it will drive the shaft 48 in one direction or the other, which, through the medium of the sprockets 49 and 51 will act against the chain 50 to turn the frame 12 in one direction or the other. The speed of this turning can of course be controlled by the relative size of the parts. The chains 16 may be kept sufficiently tight by reason of the fact that the bearings 18$^a$ are adjustable relative to the frame 12 by means of slidably bolted plates 18$^b$. When these chains are tightened in this manner, this of course moves the whole engine frame 24—25 rearwardly and consequently the bolts 26 must have a corresponding attachment relative to the frame 24, and this I provide by means of the securing bolts 30$^a$ which join the bolts 26 and the frame 24 being slidable in slots 24$^a$ in the sides of the frame 24.

Since the entire power unit is dirigible, this makes any headlights carried by said unit also dirigible relative to the entire vehicle which is of great advantage and also the driver always faces in the direction in which he is traveling since the seat as shown in Fig. 2 is carried directly by the power unit.

From the foregoing description it can be readily seen that the power unit of the dray is an entirely independent structure from the load unit. The load unit is suspended below the power unit with a very flexible connection which will allow of any unevenness between the two units being wholly compensated for. This latter structure is that carried out by the ball and socket member. Another feature of great advantage is the fact that the power unit is capable of being steered independently of the load unit. Also the traction gained by my especial structure is greatly superior to that wherein power is applied to the rear wheels of a four-wheeled structure.

By having the dray bed built very low, heavy loads may be readily loaded and unloaded from the same which is an advantage of great dimensions. Also the power unit being entirely separate from the load unit, there is no undue strain on the same due to the gravity pressure of the load, it merely acting as a tractor rather than as a load supporting structure.

A further advantage of my improved mechanism is that the power unit, as is apparent, is at all times entirely accessible whether the dray is loaded or not which is a great convenience in the event that access is desirable to the same. Also by having a front wheel driving unit this positively eliminates the danger of skidding.

From the foregoing description it will also be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention as defined by the appended claims.

Having thus described my invention what I claim as new and useful and desire to secure by Letters Patent is:

1. A motor dray comprising a load unit consisting of a wheel mounted body, a pair of supporting beams secured to the body and converging from the rear end of the body toward the forward end thereof and then paralleling each other a distance beyond the forward end of the body, socketed casings clamped between the parallel beams at a point intermediate their ends, a power unit comprising an independent wheel mounted frame, a ball suspended from such frame and received by the socketed casings, and means for driving and steering the power unit.

2. A motor dray comprising a load unit, a projecting tongue on such load unit, a power unit comprising a wheel mounted frame with means mounted on the frame to drive the wheels, the tongue of the load unit being pivotally suspended below the frame and centrally thereof, the tongue extending on each side of the pivotal point, and rollers interposed between the tongue and the frame, whereby the ends of the power unit are balanced on the tongue.

3. A motor dray comprising a frame, an axle disposed centrally across the frame, wheels on the ends of the axle, a tongue pivotally suspended below the frame and extending at each end beyond the pivotal point, the outer ends of the frame being balanced on the tongue, a load unit connected with one end of the tongue, and a power plant mounted on the frame and connected in driving relation with the wheels.

4. A motor dray comprising a frame, an axle disposed centrally across the frame, wheels on the ends of the axle, a tongue pivotally suspended below the frame and extending at each end beyond the pivotal point, the outer ends of the frame being balanced on the tongue, a load unit connected with one end of the tongue, a shaft journaled in one end of the frame, an engine mounted on the frame and connected in driving relation with the shaft, the shaft in turn being connected in driving relation with said wheels.

5. A motor dray comprising a frame, an axle disposed centrally across the frame, wheels on the ends of the axle, a tongue pivotally suspended below the frame and extending at each end beyond the pivotal point the outer ends of the frame being balanced on the tongue, a load unit connected with one end of the tongue, a shaft journaled at one end of the frame and connected in driving relation with the wheels, a second frame on the shaft at one end and having a resilient connection with the opposite end of the first named frame, and an engine carried by the second frame and connected in driving relation with the shaft.

In testimony whereof I affix my signature.

OMAR L. BRAINARD.

Copies of this patent may be obtained for five cents each, by addressing the "Commissioner of Patents, Washington, D. C."